United States Patent Office 3,166,491
Patented Jan. 19, 1965

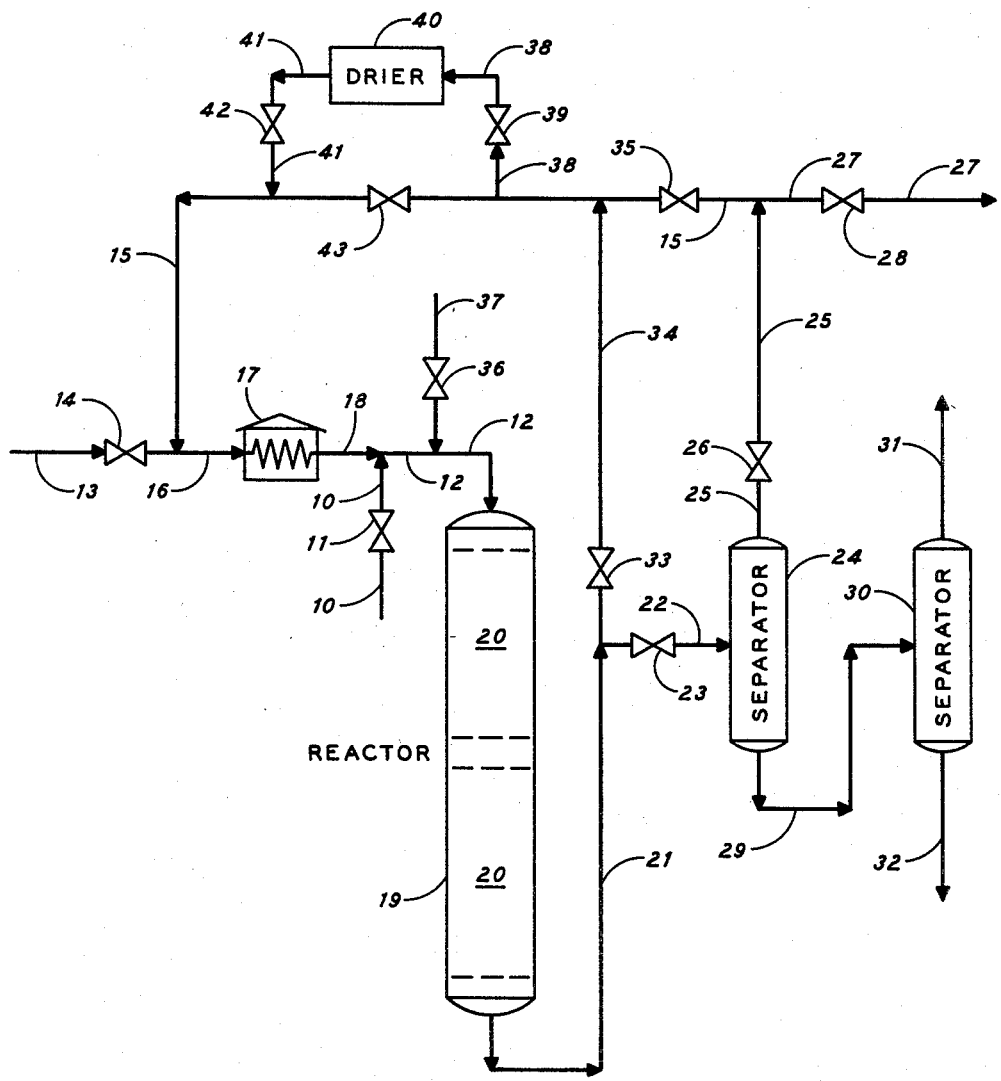

3,166,491
IN SITU SULFIDING OF NICKEL- AND
COBALT-CONTAINING CATALYSTS
Phillip D. Harvey, Walnut Creek, James A. Robbers, Lafayette, John W. Scott, Jr., Ross, and Harold F. Mason, Berkeley, Calif., assignors to California Research Corporation, San Francisco, Calif., a corporation of Delaware
Filed Mar. 27, 1962, Ser. No. 182,875
4 Claims. (Cl. 208—111)

This invention relates to a method of converting nickel and/or cobalt hydrogenating-dehydrogenating components of a catalyst into their corresponding sulfides, and, more particularly, to such a method wherein the sulfiding is performed in situ, i.e., within the reaction zone itself. The invention also relates to a combined catalyst sulfiding method and start-up procedure for a hydrocracking reaction employing a nickel and/or cobalt sulfide-containing catalyst.

There has recently been developed a commercial process for the low temperature hydrocracking of hydrocarbon feedstocks. One specific example of such a process is completely described in U.S. Patent 2,944,006 to Scott. Briefly, this process is directed to the hydrocracking of low nitrogen-containing hydrocarbon feed fractions to produce more valuable lower boiling products by contacting the feed fractions, along with added hydrogen, in a hydrocracking zone with a catalyst comprising nickel sulfide and/or cobalt sulfide disposed on an active cracking support at temperatures below about 700° F. and at a pressure of at least 350 p.s.i.g.

The nickel sulfide- and/or cobalt sulfide-containing catalyst for such a process can be prepared by impregnating an active cracking support, such as silica-alumina cracking catalyst, with nickel nitrate to give the impregnated silica-alumina a nickel content of the desired amount. The nitrate can then be decomposed, and the resulting material sulfided by contact with hydrogen sulfide or with hydrogen and a low molecular weight mercaptan or organic sulfide. Obviously, this preparation method can be done prior to the loading of the catalyst into the hydrocracking zone where it is to be employed. However, in many situations, it would be desirable to convert the nickel and/or cobalt hydrogenating-dehydrogenating components of the catalyst to their respective sulfides within the reaction zone itself, i.e., in situ sulfiding. Furthermore, it has been found that in the operation of such a hydrocracking process the catalyst must be sulfided before it is contacted with any substantial amount of hydrocarbon. If this is not done, undesirable temperature run-aways occur, that increase catalyst temperature beyond that desired, and, in fact, oftentimes lead to deleterious effects upon the catalyst because of sintering, coking, and the like. The method of the present invention provides a method for in situ sulfiding and is also tied in with a preferred start-up procedure for the described hydrocracking process.

One embodiment of the present invention provides a method for the in situ sulfiding of the hydrogenating-dehydrogenating component of a catalyst located within a reaction zone, the catalyst comprising at least one hydrogenating-dehydrogenating component selected from the group consisting of nickel, nickel oxide, cobalt and cobalt oxide disposed on a catalyst support, which comprises treating said catalyst in the following sequence of steps:

(a) Purging the reaction zone and catalyst of substantially all oxygen-containing fluids;
(b) Passing a substantially $C_3+$ hydrocarbon-free hydrogen-rich gas into the reaction zone at a pressure in excess of 50 p.s.i.g.;
(c) Adjusting the temperature of the catalyst within the reaction zone in the range of from about 350° to 750° F.;
(d) Injecting a sulfide into the hydrogen gas such that the resulting hydrogen-sulfur mixture contains at least 0.2 mol percent sulfur;
(e) Continuing the addition of said sulfide until the sulfur content of the effluent gas from the reaction zone indicates substantially complete sulfiding of the hydrogenating-dehydrogenating component of the catalyst.

A complete description of the persent method can best be made in conjunction with the accompanying figure which shows a typical reaction zone with atttendant gas recovery facilities. The figure is schematic only, with many pumps, exchangers and the like omitted for simplification. These omitted equipment items can readily be supplied by anyone skilled in the art.

With respect to the figure, a brief description first of the general operation of a hydrocracking process will aid in the further description of the particular method covered by the present invention.

Fresh feed is passed into the system by line 10, through valve 11 into line 12, wherein it is admixed with make-up hydrogen entering by line 13 through valve 14 and by recycle hydrogen joining the make-up hydrogen by line 15, the combined make-up hydrogen and recycle hydrogen passing by line 16 into furnace 17, wherein it is raised to the necessary temperature. Thereafter, the combined hydrogen streams are passed by line 18 into line 12, where they are mixed with the fresh feed and thence the hydrogen and feed are passed by line 12 into hydrocracking reaction zone 19. The feed and hydrogen contact the hydrocracking catalyst 20 (herein shown as being in two fixed beds) and the reaction products pass from reactor 19 by line 21 and thence by line 22 through valve 23 into high pressure separator 24. In high pressure separator 24 a gaseous stream composed predominantly of hydrogen is flashed off and leaves separator 24 by line 25 through valve 26. At least a portion of the hydrogen-rich stream can be passed from line 25 into line 15 and recycled into line 16. If desired, portions of this hydrogen-rich stream can be removed from the system by line 27 through valve 28.

The reaction products, less the hydrogen-rich stream flashed off through line 25, is passed by line 29 into low pressure separator 30, wherein light hydrocarbons (nominally $C_4$'s minus) are passed from the system by line 31. The remaining reaction products are passed from low pressure separator 30 by line 32 and thence to distillation facilities (not shown) for separation into the desired products which may include recycle streams that can be passed from the distillation section to join the fresh feed entering by line 10.

With the general process description in mind, the in situ sulfiding method of the present invention as it applies to the briefly-described hydrocracking system is as follows.

The method of the invention will be seen to involve the passage of various gases through the reaction system. Although once-through operation is entirely feasible, it is preferred to recirculate the various gases, so the description will be made with such a recycle operation. For this purpose, the high pressure separator 24 and low pressure separator 30 can be bypassed. Therefore, a bypass system is shown on the figure. This involves closing valve 23 in line 22 and opening valve 33 in line 34 (the latter line joining recycle line 15). Valve 35 in line 15 should also be closed, as should valve 11 in the feed inlet line 10. The closed reaction system then includes only lines 13, 16, 18 and 12 through reactor 19 into lines 21, 34 and 15 and thence back to line 13.

The present method starts with reactor 19 containing at least one bed 20 of catalyst which has, as the hydrogenating-dehydrogenating component of the catalyst, at least one component selected from the group consisting of nickel, nickel oxide, cobalt and cobalt oxide. These components are disposed upon a catalyst support, preferably an active cracking support containing from 40 to 98% silica.

The reaction zone and catalyst within that zone are first purged of all oxygen-containing fluids. With respect to the latter, all oxygen-containing gases such as air and the like are purged so as to remove any explosion hazard. Oxygen-containing fluids, particularly water, are also purged from the system since water is frequently deleterious to the catalyst with respect to its activity. This purging step is done for example with an inert gas; preferably nitrogen.

Purging can be accomplished, for example, by evacuating the reaction zone to a partial vacuum and passing dry nitrogen through the closed system. Preferably, the inert gas purge is then pressured to 50 pounds or more so that any leaks in the system can be detected. If desired, a number of evacuation-nitrogen purgings can be employed.

The purging gas is then removed from the system and dry hydrogen gas, substantially free of any hydrocarbons, is passed into the closed reaction system at a pressure in excess of 50 p.s.i.g. If desired, the hydrogen can be evacuated from the system, the pressure reduced, and then additional hydrogen passed into the reactor system. After the hydrogen has been finally passed into the system, its pressure should be adjusted to at least 50 p.s.i.g., preferably 100 p.s.i.g. or more.

The temperature of the catalyst is then adjusted within the range of from about 350° to 750° F. This can be accomplished by heating the hydrogen recycling through the system by furnace 17. Preferably, the catalyst is heated so that the catalyst temperature in the top of the reactor 19 is at a temperature in the range of from about 400° to 500° F. and the catalyst in the bottom of reactor 19 in the temperature range of from about 350° to 450° F. However, until the catalyst temperature has been raised to about 250° F. or more, one of two possible steps should be done. Both of these steps are directed to the prevention of any water formed in the heating step (below about 250° F.) from contacting the catalyst since water tends to deactivate it. One way to prevent this is to dry at least a portion of the recirculating hydrogen. This can be done by inserting a drier, containing, for example, a molecular sieve that selectively removes water, in the recycle system. The hydrogen can be dried by passing it from line 15 through line 38, open valve 39, drier 40, line 41 and open valve 42 and thence back into line 15. During such a drying step, valve 43 on line 15 should be closed. Of course, only a portion of the hydrogen need be recycled through the drier.

Another way of preventing any water produced in the heating step from contacting the catalyst is to heat the catalyst with once-through, rather than recycle, hydrogen until the temperature is above about 250° F. If this manner is employed, fresh hydrogen enters the system by line 13, is heated in furnace 17, passes through reactor 19 and can be removed by line 27 through open valves 33, 35 and 27. In such an operation, valves 43 (in line 15) and 26 (in line 25) should be closed. If the latter method of water removal is employed, after the catalyst temperature reaches about 300° F., the hydrogen is then again recycled in the manner described.

The sulfiding step is now initiated. This is done by injecting the sulfiding chemical into the system through valve 36 in line 37. The sulfiding chemical can be, for example, hydrogen sulfide, a low molecular weight mercaptan or an organic sulfide. Sufficient sulfiding chemical is added so that the hydrogen-sulfur mixture recirculating through the system contains at least 0.2 mol percent sulfur, preferably 0.5 to 2.5%. Since essentially all of the sulfur in the gas is reacted with the catalyst upon contact, the addition of the sulfiding chemical is continued until the effluent gas, for example the gas leaving reactor 19 by line 21, indicates substantially complete sulfiding of the hydrogenating-dehydrogenating components of the catalyst located within reactor 19. This degree of sulfiding can be determined by analyzing the gas leaving reactor 19 by line 21. If this effluent gas has essentially the same sulfur content as the gas entering reactor 19 by line 12, the catalyst can be considered sulfided.

If a sulfide other than hydrogen sulfide is employed, the hydrogen partial pressure within the system will gradually decrease due to the presence of light hydrocarbons formed by the decomposition of the organic sulfide. In order to maintain the desired hydrogen partial pressure, a portion of the recycle gas should be bled from the system (for example, from line 27) and make-up hydrogen added as required to maintain the desired system pressure.

When the circulating gas leaving reactor 19 has essentially the same sulfur concentration as that entering the reactor, preferred operation is to adjust the temperature of the catalyst within reactor 19 to a point such that the temperature of the catalyst in the top of the reactor is from about 500° to 600° F. and the catalyst in the bottom of the reactor will have a temperature on the order of 475° to 575° F. Still more preferred operation is to hold the temperatures within the noted ranges and to continue circulating the hydrogen-sulfur gas mixture through the system for thirty minutes or more.

At this step in the procedure, the catalyst is sulfided and the start-up of the hydrocracking process can be initiated. The separator system should be reconnected by opening valve 23 in line 22, opening valve 26 in line 25, opening valve 35 in line 15, and by closing valve 33 in line 34. At this point, the essentially pure hydrogen entering the system from line 13 can be replaced with less pure hydrogen, such as catalytic reformer off gas which has a relatively high concentration of hydrogen but which also contains appreciable amounts of hydrocarbon light gases. The use of substantially hydrocarbon-free hydrogen is only necessary before the hydrogenating-dehydrogenating component of the catalyst is partially or completely sulfided, since it has been found that the presence of hydrocarbons on the catalyst before sulfiding can cause undesirable temperature run-aways due to the exothermic cracking and saturation reactions that occur when the hydrogenating-dehydrogenating components are in the form of the metal or metal oxide.

The system is now gradually pressured to the desired operating pressure, namely above 350 p.s.i.g., and normally in the range of about 500 to 2500 p.s.i.g. Preferred operation is to continue adding the sulfiding chemical at the same concentration as previously described. Likewise, the catalyst temperature is adjusted to that necessary for the reaction, this temperature normally being in the range of from about 350° to 700° F. for the hydrocracking process previously referred to in the Scott Patent 2,944,006. A desirable starting temperature is from about 400° to 600° F. While these pressure and temperature adjustments are made, the circulation of hydrogen-sulfur mixture is continued. If desired, the system can be depressured to remove the hydrogen-sulfur mixture, but this is not necessary.

The feed is now introduced at a relatively low space rate by line 10 through open valve 11. Portions of this initial feed will be absorbed by the catalyst increasing its temperature. As soon as the adsorption reaction is concluded, the feed rate to the reactor can be increased while maintaining the desired reaction temperatures and pressures. The in situ sulfiding and the start-up procedures are now completed and regular operations can thereafter be followed.

The necessity for employing the combined sulfiding and start-up operation of the present invention can best be shown by two distinct commercial sulfiding and start-up runs on a commercial hydrocracking unit of the type disclosed in the afore-noted Scott patent. The first operation was conducted in essentially the manner described above with one notable exception. In that case, a hydrogen-containing off gas from a catalytic reformer was employed instead of the essentially pure hydrogen required by the subject invention. This gas averaged about 85% hydrogen, with the remainder being composed of light hydrocarbons. At the stage in the sequence when the catalyst temperature was attempted to be regulated at about 575° F., it was noted that the catalyst temperature began to increase rapidly and exceeded 700° F. in a short period of time. Before the temperature could be controlled, by halting heating of the feed to the reactor and the hydrogen, the catalyst had reached temperatures in excess of 1060° F. and were still rising. This was, of course, undesirable, and the explanation is that the temperature excursion probably was caused by the hydrocracking of the $C_3+$ components in the reformer hydrogen which were absorbed on the catalyst. With the sequence described in the present invention, i.e., using essentially pure hydrogen, no such temperature run-away occurred. Thus, the importance of employing a hydrogen essentially free of any hydrocarbon is shown.

The sulfiding method of the present invention has been described with particular reference to catalyst employed in hydrocracking processes. Although the in situ sulfiding and start-up procedure is preferably applied to such an operation, it must be understood that the subject method is applicable for sulfiding any catalyst that comprises nickel and/or cobalt metals and/or oxides. Furthermore, the method can be employed on both fresh catalyst or catalyst that has been used and regenerated, as for example by contact with an oxygen-containing gas.

We claim:

1. In a process wherein a catalyst, comprising at least one hydrogenating-dehydrogenating component selected from the group consisting of nickel, nickel oxide, cobalt and cobalt oxide associated with a catalyst support, located within a reaction zone is treated in situ so as to convert at least a portion of said hydrogenating-dehydrogenating component to its corresponding sulfide, the improvement in said process, so as to prevent undesirable temperature run-aways within said reaction zone caused by contact of heated hydrocarbons with said catalyst prior to the sulfiding of said hydrogenating-dehydrogenating component, which comprises treating said catalyst in the following sequence of steps:
   (a) Purging said reaction zone and catalyst of substantially all oxygen-containing fluids;
   (b) Passing a hydrogen-rich gas substantially free of $C_3+$ hydrocarbons into said reaction zone at a pressure in excess of 50 p.s.i.g.;
   (c) Adjusting the temperature of the catalyst within said reaction zone in the range of from about 350° to 750° F., said temperature adjusting step being conducted such that essentially no water contacts the catalyst at a temperature below about 250° F.;
   (d) Injecting a sulfide into said hydrogen-rich gas such that the resulting hydrogen-sulfur containing mixture contains at least 0.2 mol percent sulfur; and
   (e) Continuing the addition of said sulfide until the sulfur content of the effluent gas from said reaction zone indicates substantially complete sulfiding of the hydrogenating-dehydrogenating component of the catalyst.

2. The process of claim 1 wherein essentially pure hydrogen gas is employed in step (b).

3. The process of claim 1, wherein step (e) comprises continuing the addition of said sulfide until the effluent gas from said reaction zone has substantially the same sulfur content as the hydrogen-sulfur-containing mixture entering said reaction zone.

4. A start-up procedure for initiating the hydrocracking of hydrocarbon feed stocks without also initiating undesirable temperature runaways within the hydrocracking reaction zone, which comprises the following sequence of steps:
   (a) Loading said hydrocracking reaction zone with a catalyst comprising a hydrogenating-dehydrogenating component associated with an active catalyst support, said hydrogenating-dehydrogenating component comprising at least one member of the group consisting of nickel, nickel oxide, cobalt and cobalt oxide;
   (b) Purging said reaction zone and catalyst of all oxygen-containing fluids;
   (c) Passing a hydrogen-rich gas substantially free of $C_3+$ hydrocarbons into said reaction zone at a pressure in excess of 50 p.s.i.g.;
   (d) Adjusting the temperature of the catalyst in the range of from about 350° to 750° F., said temperature adjustment being conducted such that essentially no water contacts the catalyst at a temperature below about 250° F.;
   (e) Injecting a sulfide into said hydrogen rich gas such that the resulting hydrogen-sulfur-containing mixture contains at least 0.2 mol percent sulfur;
   (f) Continuing the addition of said sulfide until the sulfur content of the effluent gas from said reaction zone indicates substantially complete sulfiding of the hydrogenating-dehydrogenating component of said catalyst;
   (g) Increasing the pressure within the reaction zone to above 350 p.s.i.g.; and
   (h) Contacting said hydrocarbon feed stocks in said reaction zone, along with added hydrogen, with the resulting sulfided catalyst at a temperature in the range from about 350° to 750° F. and a pressure in excess of 350 p.s.i.g.

References Cited in the file of this patent

UNITED STATES PATENTS

| | | |
|---|---|---|
| 2,895,898 | Brooks et al. | July 21, 1959 |
| 2,944,005 | Scott | July 5, 1960 |
| 2,944,006 | Scott | July 5, 1960 |
| 3,099,617 | Tulleners | July 20, 1963 |